United States Patent [19]

Ramey

[11] Patent Number: 5,556,012
[45] Date of Patent: Sep. 17, 1996

[54] APPARATUS FOR HANDLING ENVIRONMENTALLY SENSITIVE MATERIALS

[76] Inventor: Thomas N. Ramey, 1529 Bernina Dr., Frazier Park, Calif. 93222

[21] Appl. No.: 302,004

[22] Filed: Sep. 12, 1994

Related U.S. Application Data

[63] Continuation of Ser. No. 10,332, Jan. 28, 1993, abandoned.

[51] Int. Cl.$^6$ .................................................. G01F 11/00
[52] U.S. Cl. .................... 222/608; 222/189.06; 222/196; 222/238; 222/272
[58] Field of Search .................... 222/236–241, 222/185, 189, 333, 608, 196, 202, 410–413, 185.1, 189.06, 189.11, 272

[56] References Cited

U.S. PATENT DOCUMENTS

| | | | |
|---|---|---|---|
| 692,715 | 2/1902 | Sargeant | 222/202 X |
| 1,190,168 | 7/1916 | Holly | 222/196 X |
| 1,668,324 | 5/1928 | Kreisinger | 222/238 X |
| 1,880,840 | 10/1932 | Currier | 222/238 X |
| 2,585,169 | 2/1952 | Potter . | |
| 2,594,687 | 4/1952 | Scott | 222/238 |
| 2,743,850 | 5/1956 | Hamilton | 222/238 |
| 2,881,956 | 4/1959 | Bjerre | 222/238 X |
| 2,965,379 | 12/1960 | Ganley | 222/413 X |
| 3,197,075 | 7/1965 | Hansen | 222/413 X |
| 3,198,398 | 8/1965 | Schreiber, Jr. | 222/608 |
| 3,258,165 | 6/1966 | Guyer | 222/238 X |
| 3,403,824 | 10/1968 | Biehl | 222/238 X |
| 3,411,675 | 11/1968 | Wahl | 222/413 X |
| 3,593,890 | 7/1971 | MacKinnon | 222/608 X |
| 3,879,150 | 4/1975 | Brown et al. | 222/238 X |
| 4,927,293 | 5/1990 | Campbell . | |
| 4,979,967 | 12/1990 | Walter et al. . | |

FOREIGN PATENT DOCUMENTS

| | | |
|---|---|---|
| 1053408 | 3/1959 | Germany . |
| 1297390 | 6/1969 | Germany . |
| 1402505 | 6/1988 | U.S.S.R. . |

Primary Examiner—Kevin P. Shaver
Attorney, Agent, or Firm—Dennis B. Haase

[57] ABSTRACT

A portable vessel for containment of environmentally sensitive materials during transportation thereof, and during discharge thereof, comprising a sealable vessel having capability of holding a negative pressure, and including a filter system for drawing out gasses contained in said vessel, and a dual auger vessel discharge system to remove the material from the vessel without the necessity of human contact therewith.

9 Claims, 2 Drawing Sheets

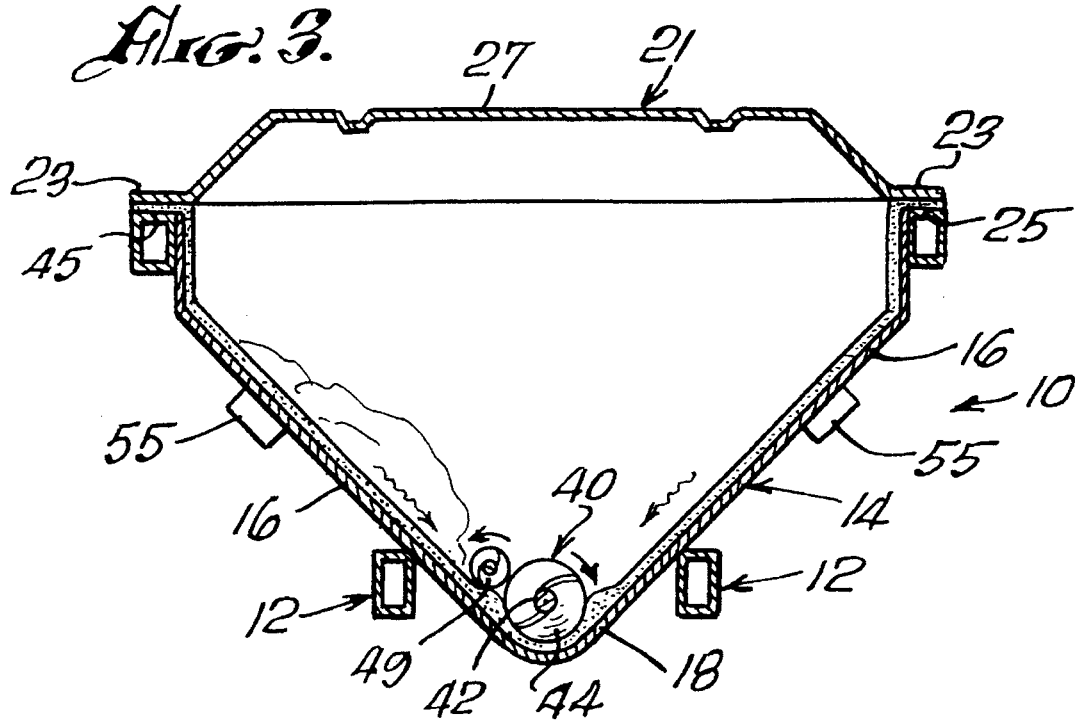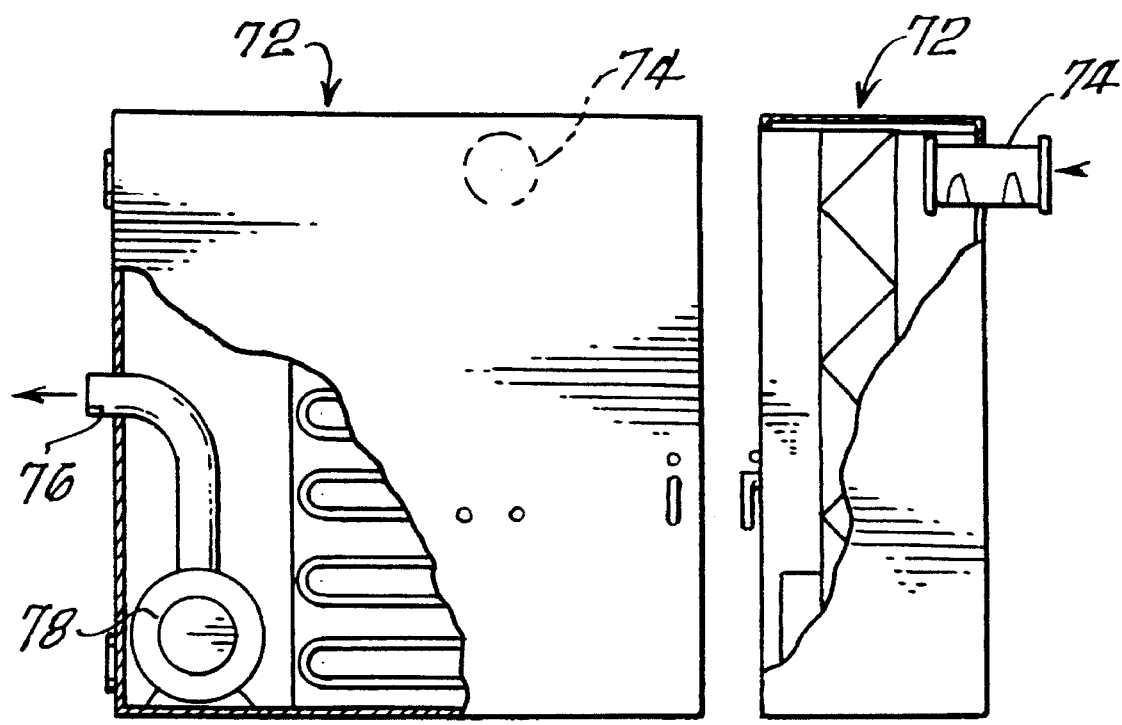

APPARATUS FOR HANDLING ENVIRONMENTALLY SENSITIVE MATERIALS

This application is a continuation of application Ser. No. 08/010,332 filed Jan. 28, 1993, now abandoned.

The present invention relates to material handling apparatus and, more particularly, to the handling of environmentally sensitive materials such as, for example, soils that have been saturated with hydrocarbon fuels, pesticides, fungicides, or liquids and semi-liquids containing toxic, or otherwise environmentally sensitive materials.

BACKGROUND OF THE INVENTION

1. Field of the Invention

Within the last two decades there has been a greatly accentuated emphasis on environmental concerns. As the identification and regulation of potentially environmentally harmful materials increases, so do the problems relating to disposition of such materials.

While the problem is not indigenous to any particular geographic area, it seems to be more prevalent in agricultural and industrialized areas.

Wherever the problem is found, it tends to break down into several well defined areas, among them, identification, transportation, neutralization, destruction or storage, and the area to which the present invention relates, storage and transportation.

2. Overview of the Related Art

While pockets of materials identifiable as of environmental concern burgeon, methods of storage and transportation have remained relatively primitive, given the high level of national and, indeed, international, concern. Techniques for on site remediation have received a lot of attention, for obvious reasons. However, where such techniques are inefficient or not cost effective, or unavailable, there must be means by which contaminated sites can be purged of the problem, and that typically means that the environmentally unacceptable materials, and any materials contaminated thereby, must be moved and stored.

Several storage sites have been established. However, most such sites are, for obvious reasons, remote, and often a great distance from the contaminated site. A generally accepted method of handling such materials is to pack the contaminates in drums, such as 55-gallon drums in common use for transportation of liquids, and to truck, or otherwise transport, the drums to a storage site. Such a method, and those akin to it, are not only inefficient, but require a considerable amount of undesirable human contact with potentially health threatening materials, a consequence which the present invention seeks, successfully, to ameliorate. Clearly, when the problem involves several thousand, or even hundreds of thousands, of cubic yards of material, such methods are not cost effective.

Walter recognized a problem and offered a solution documented in U.S. Pat. No. 4,979,967, which discloses a truck for hauling contaminants. The essence of that apparatus seems to be the use of water to hold down dust, although it does suggest the use of an air filter. The filter differs from that of the present invention in significant ways, however, not suggested by the inventor.

Campbell U.S. Pat. No. 4,927,293 is illustrative of a device that tries, not only to store and transport environmentally unacceptable materials, but actually process them, in situ, which is far afield from the present invention.

Several examples of the use of augers as unloading devices are located, among them, the following: Potter U.S. Pat. 2,585,169 having two augers which work separately and individually; German Patent 1,053,408 in which two augers work material towards the center unloading; German Patent 1,297,390 for a combine; and Russian Patent 1,402,505 which appears to be a single auger application. It is apparent, however, that these patents neither teach, nor suggest a dual auger system in which the augers work together, automatic unloading of toxic materials on which the present invention is focused.

SUMMARY OF THE INVENTION

The present invention comprises a wheel mounted enclosable vessel capable of receiving environmentally sensitive materials in either liquid or particulate form, or any intermediate form thereof; and to store, transport, and deposit the contents of the vessel in an environmentally sound manner.

In keeping with this principal objective, it is a corollary thereof to provide a mobile trailer type device comprising an enclosed vessel for handling environmentally sensitive materials wherein fugitive gasses are purged before discharge to the atmosphere.

It is yet another objective of the present invention to provide a vessel of the type described where toxic liquids are restrained within the vessel until discharged at an appropriate receiving facility.

Still another objective of the present invention is to provide a vessel of the type described which may be fully unloaded, automatically, from a remote position so as to obviate the necessity of potentially health threatening human contact with the toxic contents of the vessel.

The foregoing, together with other significant benefits and features of the invention, will become apparent in reading the description of a preferred embodiment taken in conjunction with the accompanying drawings, wherein:

DESCRIPTION OF THE DRAWINGS

FIG. 3 is a transverse section of the vessel taken along 3—3 of FIG. 1, illustrating, among other features, the augering unload system of the present invention;

FIG. 4 is an elevation view of the filter system of the present invention, partially sectioned to highlight certain features thereof; and FIG. 5 is an end view of the filter system of FIG. 4, partially sectioned to show other features thereof.

DESCRIPTION OF A PREFERRED EMBODIMENT

Figure 1:
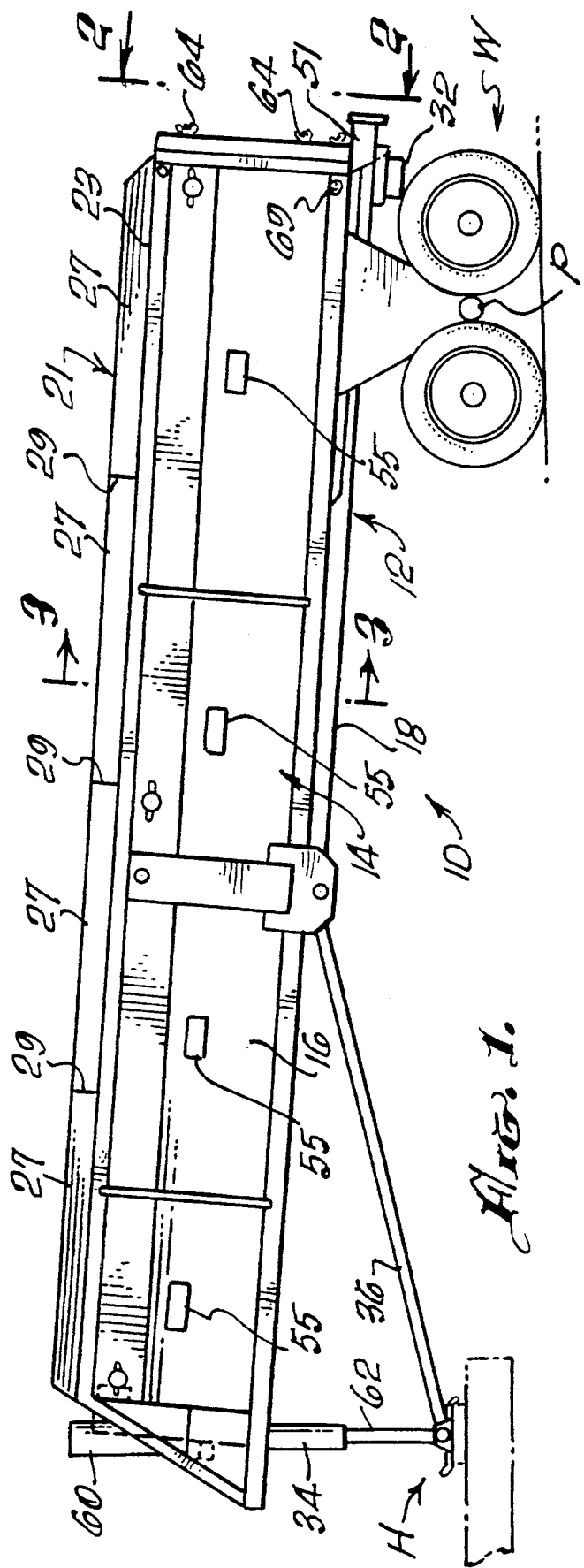
FIG. 1 is a side elevation of a towable vessel constructed in accordance with the present invention.

With reference now to the drawings, and initially to FIG. 1, a mobile vessel is illustrated at 10. As shown, the vessel 10 is a trailer, meant to be towed by a tractor, not illustrated, by means of a forward hitch mechanism, secured to the forward end of the vessel 10, on a set of rear wheels, W, mounted, in any well known manner, to the frame or bed 12 of the vessel 10. It will be understood that the vessel may be mounted, or otherwise secured to a truck bed, or the like, without departure from the essence of this aspect of the inventions, which is mobility.

Figure 2:
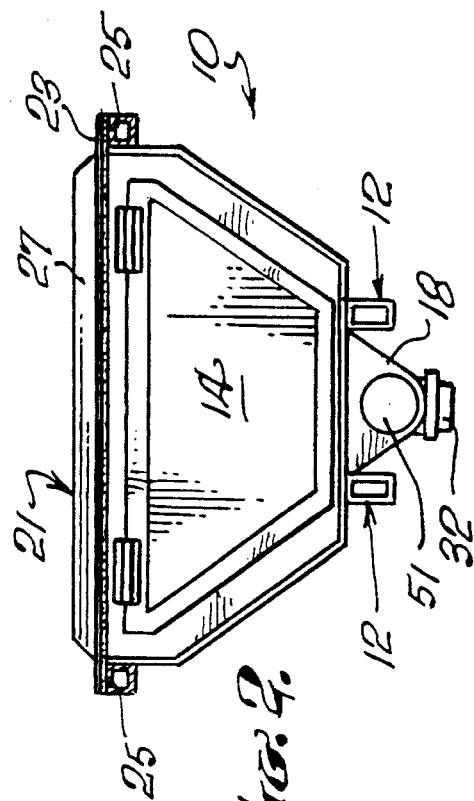
FIG. 2 is an end view of the vessel of FIG. 1, illustrating the construction of the dump and seal.

The vessel 10 comprises, in this preferred form, a receptacle 14, shown in cross section in FIG. 2 as having converging side walls 16, which are supported by the frame 12 and meet at the low point of the vessel 10 to define a discharge trough 18, which extends substantially the length of the receptacle 14, along its longitudinal axis.

In order to accomplish the objective of being able to contain and transport a wide variety of environmentally sensitive materials in various states such as solids and liquids, and even materials which assume gaseous state under extreme, but attainable ambient conditions, the invention contemplates the capacity to seal the vessel to inhibit escape of fugitive vapors, as well as other contained materials. To this end, there is provided a lid, comprising a cap or lid 21, which is removably secured, at 23, to an upper laterally disposed lip or shelf 25 of the receptacle 14. The specific mode of sealing the lid to the shelf 25 is well within the skill of the art, and, therefore, not in need of detailed description.

The structure of the lid 21 may assume various forms and is, therefore, worthy of some exploration, in that it is expressly designed to enhance the ability of the invention to meet its objectives.

More particularly, the lid shown is sectioned to provide individual lid members 27, sealably joined at joints 29. The lid members are constructed to be slidable over one another to selectively expose portions of the enclosure for loading. By virtue of this construction, specific segments of the enclosure may be exposed without opening the entire enclosure, thereby inhibiting exposure of materials in the enclosure to atmosphere while loading the remainder of the enclosure.

The lid design is capable of further modification, in keeping with the invention. For example, overland hauling is governed, not only by the type of material being hauled, but by tare weight. When a light weight material is being transported, enclosures with fixed volumes preclude a hauler, who often gets paid by the weight hauled, from availing himself of the weight maximums allowed by the various states. In order, therefore, to maximize the potential of the vessel 10, the invention contemplates a lid 21 which can be varied as to height. Otherwise stated, when the load is light, a domed lid 21, having a greater height, up to the maximum overall height allowed along the route of travel, is employed to expand the usable volume of the enclosure and, thus, the tare weight of the load.

The foregoing is readily accomplished, for example, by the use of an insert, not shown, but easily envisioned. The insert would, of course, seal about the perimeter of the top of the vessel, becoming a vertical extension of the side and end walls thereof, and the lids illustrated, would then fit to the top of the insert.

It is important to recognize that the handling of environmentally sensitive materials often portends danger to those in close proximity to the material. It is inherently valuable, therefore, to be able to handle such materials with a minimum of human exposure. It is feasible, of course, to dress persons working among toxic materials in protective clothing, somewhat like the gear worn by present day astronauts. Such gear, however, is not only expensive, often prohibitively so, but it literally inhibits free movement, the consequence of which is greater susceptibility to accidents.

It is within the inventive capacity of the present invention to permit handling of environmentally sensitive materials without significant human exposure, that has added materially to the advance of this apparatus over the prior art.

Specifically, while loading is reactively problem free, it is the act of discharge which seems to cause the bulk of the injuries.

Accordingly, to ameliorate the severity of the problem, the present invention contemplates advances in the automated unloading of the vessel 10.

When the state of the material being handled is liquid, or predominantly liquid, the problem is relatively less complicated. Liquids are easily handled by means of a sealable liquid discharge port 32, disposed at or near the rear of the vessel 10. All liquids obey certain laws of physics, and will gravitate to the lowest point in any container. By providing the vessel 10 with the capacity to be elevated at its forward end, the liquid components of any load will gravitate toward the rear of the vessel, and the mouth of the discharge port.

To this end, the invention contemplates the provision of a ram 34, disposed at the forward end of the vessel, attached to the frame 12, and to the hitch H, or some other fixed point, such that when the ram is activated, the arm 36 is extended to elevate the forward end of the vessel, causing liquid components to move to the rear of the vessel with the low point being directly over the discharge port 32. By virtue of the unique features of the invention, however, the vessel need never be elevated beyond about 15°, which is a distinct advantage in terms of the power and equipment required.

Having thus disposed the liquids in a position for immediate discharge, the next problem to be addressed is the disposition of the solids. Solid materials, particularly if they are, or have been, exposed to liquids have a tendency to cake, or become clumped. Movement of such materials becomes more difficult by virtue of the adhesion which inhibits gravitational movement to a low point where discharge becomes easy.

The apparatus of the present invention overcomes this problem by providing means for exploiting the gravitational pull on the material to move it to a discharge position.

Referring primarily to FIG. 3, a discharge auger, 40, is disposed in the discharge trough 18. The discharge auger 40 includes a central shaft 42, to which is affixed a helical blade 44. The central shaft extends longitudinally in the discharge trough 18 throughout the length thereof, and is rotated by means of any well known power device, not shown, in a direction to cause movement of material in the trough 18 toward the rear of the vessel.

In order to overcome the consequences of caking of the material, a second feeder, or break away auger 49, is provided coaxially with and in close proximity to, the discharge auger 40. The feeder auger has a swath diameter in the range of one half that of the discharge auger and rotates in a direction opposite to that of the discharge auger.

In keeping with this particular aspect of the invention, the feeder auger tends to break up the material about the discharge auger 40 which may have packed or caked, thus allowing it to drop into the discharge trough 18, where it is moved by the discharge auger to a discharge hatch 51, which, when opened, permits release of the material from the vessel 10.

Depending upon the consistency of the material being transported, there may be a tendency for it to adhere to the side walls 16 of the vessel despite the angle thereof. As a further aid in discharging the contents of the vessel, vibrators 55 are provided in the exterior of the side walls 16 which, when activated, set up a resonance in the side wall to literally shake the material loose.

As yet another aid to the complete discharge of material in the vessel, the vessel is provided with a hydraulic lift device 60. The lift device is located at the forward end of the vessel 10, and as shown, has a piston arm 62 which acts against the hitch H to cause the vessel to rotate clockwise about a pivot point P at the rear axle, thereby elevating the forward end of the vessel to cause the material therein to slide rearwardly towards the discharge hatch.

Under circumstances where the material being transported is of such a nature and consistency that it can be safely dumped, as distinguished from being carefully removed through the hatch 51, the rear most transverse wall 62 of the vessel is removable to permit efficient removal of such materials. The wall is sealingly secured to the vessel by means of connectors 64 and may be fitted to and released from the vessel with minimum effort.

In accomplishing the objective of unloading the vessel with a minimum of human exposure, the present invention contemplates the provision of a remote control unit 69, conveniently housed at the rear of the vessel as shown. The remote control unit 69 may be on an elongated umbilical cord to permit the operator to stand clear of the vessel while the controls are operated to activate the augers, vibrators, tilt lift or the like, in any desired sequence, or in multiple combinations to unload the vessel.

The present invention recognizes that many of the environmentally sensitive materials that are to be transported tend to vaporize to a limited extent, and that such vapors can not be discharged to atmosphere during transportation. It is also recognized that if gasses are allowed to build up in the sealed vessel, a potentially explosive situation can readily develop.

The present invention provides for the alleviation of vessel pressure without discharging toxic fumes to the atmosphere. To this end, and with specific reference to FIG. 4, a vessel exhaust filter 72 is provided. The exhaust filter 72 receives gasses from the vessel through inlet 74, and exhausts purged vapors at 76.

Toxic gasses entering the filter are passed through one or two stages of activated charcoal, depending upon conditions, thereby purging the vapor of toxic materials. In order to assure that the gasses within the vessel will find their way to the exhaust filter, after the vessel hatches are sealed, small negative pressure is created by the filter in the vessel. This is accomplished with a pump 78, which may be any one of a number of well known devices. Sensors are provided in the filter to measure the extent of toxicity in the incoming gasses, and to activate a second stage filter when appropriate.

Testing has shown that in the case of hydrocarbon toxins, that over the transportation time, significant remediation of the material in the vessel is accomplished by virtue of the filter system, thus creating yet another benefit to the users of the system of the present invention. It will also be appreciated that the use of dual or tandem filters is well within the contemplation of the invention, and depending upon the type of material, would provide an added measure of safety.

Actual tests of the system of the present invention have demonstrated significant remediation of certain toxic materials during transportation.

Having thus described a preferred embodiment of the present invention, what is claimed is:

1. A system for storing, transporting and depositing environmentally sensitive materials in solid, liquid and gaseous form, or in combinations thereof, in an environmentally sound manner, comprising, in combination:

a vessel, said vessel being mounted on wheels to render said vessel mobile, said vessel being configured to have longitudinal side walls extending downwardly and inwardly to converge at a base member to define the low point of said vessel;

a discharge orifice at one end of said low point to discharge said environmentally sensitive materials in solid or liquid form;

material movement means for moving solid material to said discharge orifice comprising a first auger extending longitudinally along said low point; a second, single, auger having a smaller diameter than said first auger, said second auger being positioned above said first auger and adjacent to a side wall so that the axis of said second auger is offset from the axis of said first auger;

power means connected to said first and second augers for rotating said second auger in a direction opposite to the direction of rotation of said first auger, so that said second auger breaks away material in said vessel, in immediate proximity to said second auger, and moves said environmentally sensitive solid material into the path of said first auger;

a filter system for removing gaseous pollutants from said environmentally sensitive materials; and sealing means for sealing said vessel against inadvertent discharge of the environmentally sensitive materials contained therein.

2. The apparatus as set forth in claim 1, wherein vibrator means is provided, in contact with said side walls, to cause said side walls of said vessel to vibrate to cause material adhering thereto to break loose.

3. The apparatus as set forth in claim 1, wherein said vessel is provided with loading hatches at the top thereof, said hatches being selectively sealable to said vessel to prevent escape of gasses therefrom.

4. The apparatus as set forth in claim 1, said filtering system including at least one filter, said filtering system further including a pump to draw gasses from said vessel and through said filter, to thereby create a negative pressure therein, so as to inhibit escape of gasses except through said filter, and means in said filter to remove pollutants from said gasses.

5. The apparatus as set forth in claim 1, wherein said power means is remotely controlled by a remote control unit to avoid human contact with materials in said vessel.

6. The apparatus as set forth in claim 1, wherein said second auger is disposed above, and to one side of said first auger, and having a longitudinal axis which is parallel with the axes of said first auger.

7. The apparatus as set forth in claim 6, wherein vibrator means is provided, said vibrator means being in contact with said side walls, to cause said side walls of said vessel vibrate to cause material adhering thereto to break loose.

8. The apparatus as set forth in claim 6, wherein said vessel is provided with loading hatches at the top thereof, said hatches being selectively sealable to said vessel to prevent escape of gasses therefrom.

9. The apparatus as set forth in claim 6, wherein said filtering system including a pump to draw gasses from said vessel and through said filter, to thereby create a negative pressure therein, so as to inhibit escape of gasses except through said filter, and means in said filter to remove pollutants from said gasses.

* * * * *